US010785159B2

(12) United States Patent
Zemach et al.

(10) Patent No.: US 10,785,159 B2
(45) Date of Patent: Sep. 22, 2020

(54) NETWORK DEVICE HAVING FLEXIBLE RATE LIMITER

(71) Applicant: Marvell Israel (M.I.S.L) Ltd., Yokne'am (IL)

(72) Inventors: Rami Zemach, Givat Shapira (IL); Yaron Kittner, Pardes Hanna-Karkur (IL)

(73) Assignee: Marvell Israel (M.I.S.L) Ltd., Yokne'am (IL)

( * ) Notice: Subject to any disclaimer, the term of this patent is extended or adjusted under 35 U.S.C. 154(b) by 36 days.

(21) Appl. No.: 16/207,476

(22) Filed: Dec. 3, 2018

(65) Prior Publication Data

US 2019/0173798 A1 Jun. 6, 2019

Related U.S. Application Data

(60) Provisional application No. 62/595,448, filed on Dec. 6, 2017.

(51) Int. Cl.
*H04L 12/801* (2013.01)
*H04L 12/815* (2013.01)
*H04L 12/819* (2013.01)
*H04L 12/861* (2013.01)
*H04L 12/947* (2013.01)

(52) U.S. Cl.
CPC ............ *H04L 47/215* (2013.01); *H04L 47/22* (2013.01); *H04L 47/225* (2013.01); *H04L 49/251* (2013.01); *H04L 47/39* (2013.01); *H04L 49/9031* (2013.01)

(58) Field of Classification Search
CPC ..... H04L 47/215; H04L 47/225; H04L 47/22; H04L 49/251; H04L 47/39; H04L 49/9031; H04L 47/10
See application file for complete search history.

(56) References Cited

U.S. PATENT DOCUMENTS

| 2006/0203728 A1* | 9/2006 | Kwan | H04L 47/10 370/235 |
| 2008/0095053 A1* | 4/2008 | Chen | H04L 47/10 370/230.1 |
| 2016/0261503 A1* | 9/2016 | Burgess | H04L 41/0816 |

\* cited by examiner

*Primary Examiner* — Moo Jeong

(57) ABSTRACT

A network device for a communications network includes a port configured to transmit data to the network at a maximum transmit data rate. The device also includes a transmit buffer configured to buffer data units that are ready for transmission to the network, and a packet buffer configured to buffer data units before the data units are ready for transmission. The packet buffer is configured to output data units at a maximum packet buffer transmission rate faster than the maximum transmit data rate. The device includes a rate controller configured to control a transmission rate of data from the packet buffer to the transmit buffer so that averaged over a period, the transmission rate from the packet buffer to the transmit buffer is at most equal to the maximum transmit data rate, while allowing the transmission rate, at one or more time intervals, to exceed the maximum transmit data rate.

24 Claims, 2 Drawing Sheets

NETWORK DEVICE HAVING FLEXIBLE RATE LIMITER

CROSS REFERENCE TO RELATED APPLICATION

This claims the benefit of, commonly-assigned U.S. Provisional Patent Application No. 62/595,448, filed Dec. 6, 2017, which is hereby incorporated by reference herein in its entirety.

FIELD OF USE

This disclosure relates to a data device for use in a network. More particularly, this disclosure relates to a network data device having a transmit stage with a flexible rate limiter to avoid exceeding, on average, a maximum transmit data rate, while avoiding underrun.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

Network devices operate at high data rates and high bandwidths. In order to maintain communications between devices, it is important to avoid an "underrun" condition—i.e., a situation that typically occurs after transmission has started where a transmitter (for instance a port) has insufficient data for transmission—because an underrun condition may cause a remote device to assume erroneously that a session transmission is complete or that a connection has been broken, which could lead to the remote device erroneously terminating the session at its end. At the same time, it is desirable to utilize the capacity of the connection to the maximum extent possible—i.e., it is desirable to attempt to achieve "full wire speed"—without exceeding the maximum possible transmit speed of the port.

SUMMARY

In accordance with implementations of the subject matter of this disclosure, a network device for a communications network includes a port configured to transmit data to the communications network. The port is configured to transmit data units at a maximum transmit data rate. The network device also includes a transmit buffer configured to buffer data units that are ready for transmission to the communications network, and a packet buffer configured to buffer data units before the data units are ready for transmission. The packet buffer is further configured to output data units, in response to a read request, at a maximum packet buffer transmission rate that is faster than the maximum transmit data rate. The network device further includes a rate controller configured to control a transmission rate of data from the packet buffer to the transmit buffer so that averaged over a period of time for transmitting a plurality of data units, the transmission rate of data from the packet buffer to the transmit buffer is at most equal to the maximum transmit data rate, while allowing the transmission rate, at one or more selected time intervals, to exceed the maximum transmit data rate.

In a first implementation of such a network device, the rate controller is further configured to limit the transmission rate of data from the packet buffer to the transmit buffer according to a rate-limiting parameter that is different from the maximum transmit data rate.

In that first implementation, the rate-limiting parameter that is different from the maximum transmit data rate may be a cell rate governing a permissible quantity of packet buffer accesses during a time interval.

In a second implementation of such a network device, the rate controller allows the transmission rate of data from the packet buffer to the transmit buffer to exceed the maximum transmit data rate to align header and payload portions of a network packet.

In a third implementation of such a network device, the rate controller includes an in-packet rate limiter configured to control rate of transmission of data within a network packet, an inter-packet wire-speed rate limiter configured to control spacing between network packets, and an inter-packet cell-rate limiter configured to control a quantity of data cells that are transmitted from the packet buffer to the transmit buffer during a time interval.

In a first variant of the third implementation, the in-packet rate limiter is configured to limit the rate of transmission of data within the network packet to prevent read-before-write in a cut-through packet.

In a second variant of the third implementation, the in-packet rate limiter is configured to control the rate of transmission of data within the network packet to align header and payload portions of the network packet.

In a first instance of the second variant of the third implementation, the in-packet rate limiter is configured to increase the rate of transmission of data, within the network packet, above the maximum transmit data rate. In that first instance, the in-packet rate limiter is configured to increase the rate of transmission of data within the network packet to at most the maximum packet buffer transmission rate. Also in that first instance, the inter-packet wire-speed rate limiter increases spacing between network packets to limit the transmission rate of data from the packet buffer to the transmit buffer to the maximum transmit data rate on average over packets, notwithstanding the increasing the rate of transmission of data within the network packet above the maximum transmit data rate.

In a second instance of the second variant of the third implementation, the in-packet rate limiter includes processing circuitry that allows transmission of data when tokens are available in a reservoir of tokens, deducts tokens from the reservoir of tokens when data is transmitted, periodically adds tokens to the reservoir according to a rule, and adds a quantity of additional tokens to the reservoir on receipt of a request to start a new packet, the quantity of additional tokens being based on sizes of a header of the new packet and a first portion of the new packet.

In a third variant of the third implementation, the inter-packet cell-rate limiter is configured to limit the quantity of data cells that are transmitted from the packet buffer to the transmit buffer during the time interval to a maximum permissible quantity of packet buffer accesses during the time interval.

In a fourth variant of the third implementation, each respective one of the in-packet rate limiter, the inter-packet wire-speed rate limiter, and the inter-packet cell-rate limiter, includes respective processing circuitry that allows transmission of data when tokens are available in a respective reservoir of tokens, deducts tokens from the respective reservoir of tokens when data is transmitted, and periodically adds tokens to the respective reservoir according to a respective rule for the respective one of the in-packet rate limiter, the inter-packet wire-speed rate limiter, and the inter-packet cell-rate limiter.

A method according to implementations of the subject matter of the present disclosure for operating a network device coupled to a communications network includes transmitting data out of the network device via a transmit buffer to a port having a maximum transmit data rate, from a packet buffer configured to buffer data units before the data units are ready for transmission. The packet buffer is configured to output data units, in response to a read request, at a maximum packet buffer transmission rate that is faster than the maximum transmit data rate. The method further includes controlling a transmission rate of data from the packet buffer to the transmit buffer so that averaged over a period of time for transmitting a plurality of data units, the transmission rate of data from the packet buffer to the transmit buffer is at most equal to the maximum transmit data rate, and permitting the transmission rate of data from the packet buffer to the transmit buffer, at one or more selected time intervals, to exceed the maximum transmit data rate without causing the controlled transmission rate of data averaged over time to exceed the maximum transmit data rate.

In a first implementation of such a method, the controlling includes limiting the transmission rate of data from the packet buffer to the transmit buffer according to a rate-limiting parameter that is different from the maximum transmit data rate. In a variant of the first implementation, the controlling includes limiting the transmission rate of data from the packet buffer to the transmit buffer according to a cell rate governing a permissible quantity of packet buffer accesses during a time interval.

In a second implementation of such a method, the controlling includes allowing the transmission rate of data from the packet buffer to the transmit buffer to exceed the maximum transmit data rate to align header and payload portions of a network packet.

In a third implementation of such a method, the controlling the transmission rate of data from the packet buffer to the transmit buffer includes controlling a rate of transmission of data within a network packet, controlling spacing between network packets, and controlling a quantity of data cells that are transmitted from the packet buffer to the transmit buffer during a time interval.

In a first variant of the third implementation, the controlling rate of transmission of data within a network packet includes limiting the rate of transmission of data within the network packet to prevent read-before-write in a cut-through packet.

In a second variant of the third implementation the controlling rate of transmission of data within a network packet includes limiting the rate of transmission of data within the network packet to align header and payload portions of the network packet.

In an instance of that second variant, the controlling the rate of transmission of data within a network packet includes increasing the rate of transmission of data, within the network packet, above the maximum transmit data rate. In such an instance of the second variant, the controlling rate of transmission of data within a network packet includes increasing the rate of transmission of data within the network packet to at most the maximum packet buffer transmission rate. Alternatively in such an instance, the controlling spacing between network packets includes increasing spacing between network packets to limit the transmission rate of data from the packet buffer to the transmit buffer to the maximum transmit data rate on average over packets, notwithstanding the increasing the rate of transmission of data within the network packet above the maximum transmit data rate.

In a third variant of the third implementation, the controlling a quantity of data cells that are transmitted from the packet buffer to the transmit buffer during a time interval includes limiting the quantity of data cells that are transmitted from the packet buffer to the transmit buffer during the time interval to a maximum permissible quantity of packet buffer accesses during the time interval.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
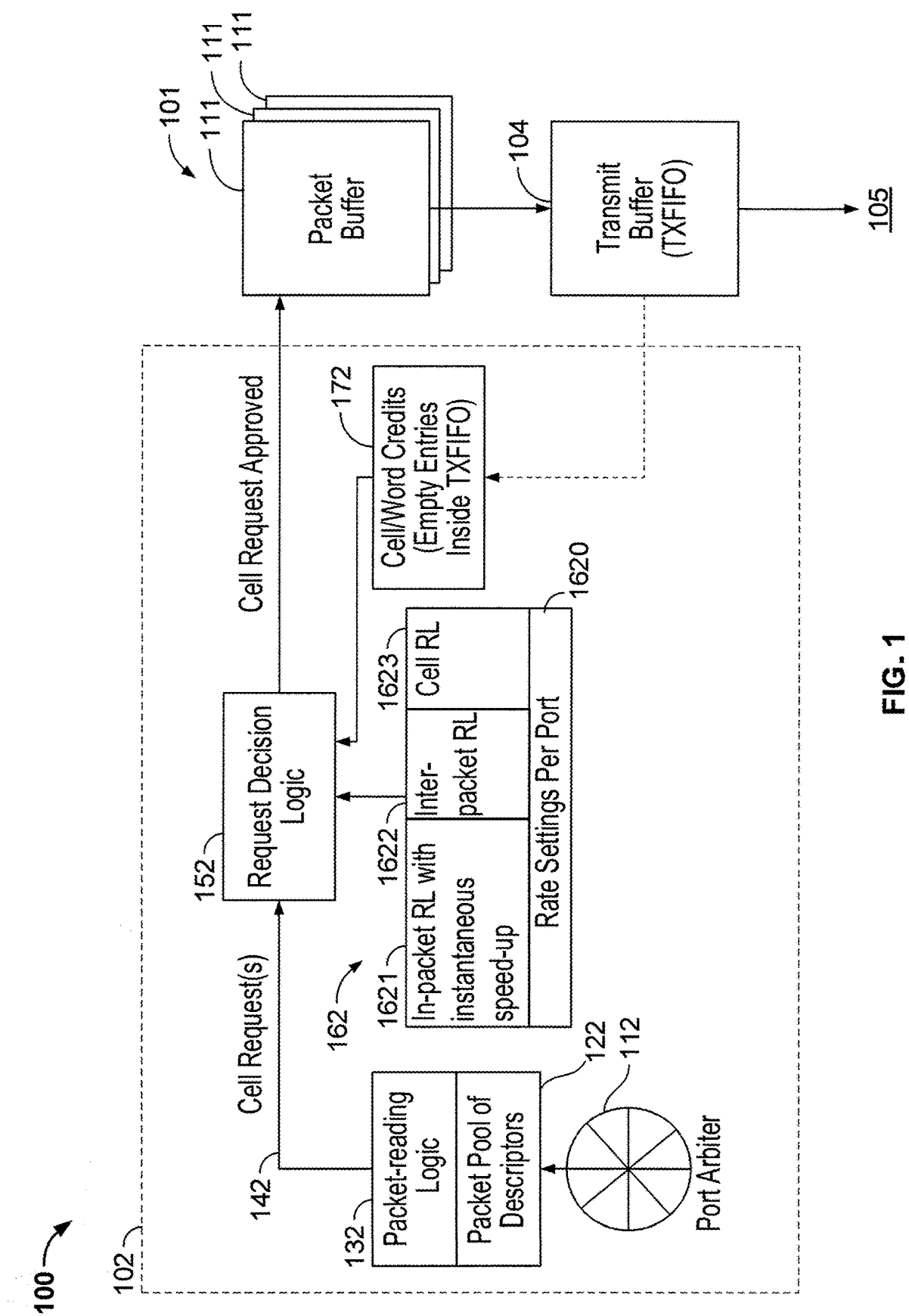
FIG. 1 is a representation of a portion of a network device in accordance with implementations of the subject matter of this disclosure.

In order to ensure, probabilistically, that underrun can be avoided while approaching full wire speed, implementations of the subject matter of this disclosure provide a network device, such as, in some implementations, a network switch, having a flexible rate limiter that limits transmissions out of the network device, on average, to a maximum transmit data rate while allowing transmissions to approach that speed—i.e., to approach full wire speed—and even to exceed the maximum transmit data rate for short times. Specifically, as part of its operation, the flexible rate limiter allows the maximum transmit data rate to be exceeded internally to the network device in certain circumstances, such as, e.g., when stitching together different portions of a packet before it is supplied to a transmit buffer, as described below, to prevent underrun.

A transmit buffer receives, from a packet buffer, responses to read requests, for forwarding to ports of the network device for transmission out of the network device. The responses are in the form of portions of a packet. The portion can be a "cell" of a defined size (e.g., determined by bus width) or a more generic "chunk" of data. The rate at which the transmit buffer receives the responsive chunks or cells of the packet to be transmitted is determined by transmit direct memory access (TX DMA or TXD) circuitry. A network device in accordance with implementations of the subject matter of this disclosure has a flexible rate limiter as part of the TX DMA circuitry.

A flexible rate limiter in accordance with implementations of the subject matter of this disclosure incorporates three different types of rate limiters.

A first type of rate limiter may be referred to as an in-packet rate limiter, and regulates the rate at which data in a network packet flows from the packet buffer to a port of the network device. The in-packet rate limiter enforces a data rate limit within a chunk or cell of the packet when that chunk or cell is being transmitted; the in-packet rate limiter does not affect the number of cells that may be transmitted per unit time. Generally, the maximum data rate permitted by the in-packet rate limiter is the maximum transmit data rate of the port. However, the in-packet rate limiter allows "speed-up"—i.e., allows the maximum transmit data rate to be exceeded—in limited circumstances.

For example, in some implementations, referred to as "cut-through" transmissions, transmission of chunks or cells of a packet out of the network device onto the network begins even though in some instances not all chunks or cells of the packet have arrived at the transmit buffer of the network device. At the same time, in such implementations, the port expects a chunk or cell of data at regular intervals—e.g., every five clock cycles—once data begins to flow toward the port. Thus, in one implementation, the second chunk or cell must arrive at the port within five clock cycles of the arrival of the first chunk or cell, the third chunk or cell must arrive within ten clock cycles of the arrival of the first chunk or cell, etc. Whenever this requirement is violated, underrun may occur, possibly resulting in a fatal packet error.

In some cases, the header chunk or cell of a cut-through packet may not be aligned with the payload chunks or cells of the packet because one or the other of the header chunk or cell and the payload chunks or cells may be smaller than the maximum permitted chunk or cell size (which frequently corresponds to the bus width—e.g., 128 bytes). In the implementation described in the preceding paragraph, if the gap between chunks or cells would cause an interval of more than five clock cycles, then an underrun condition would occur. In such a case, the in-packet rate limiter would allow a higher data rate—i.e., allow a transmission rate from the packet buffer to the transmit buffer to exceed the maximum transmit data rate—so that the header and payload could be realigned—i.e., brought closer together—so that the gap between them would not cause an underrun condition. It is noted that for such a speed-up to occur in some implementations, the packet buffer would have to have a maximum packet buffer transmission rate that is faster than the maximum transmit data rate.

A second type of rate limiter may be referred to as an inter-packet wire speed rate limiter, and regulates the transmission rate of entire packets so that the maximum transmit data rate, on average, is not exceeded, which also could cause a fatal packet error. One reason why the inter-packet wire speed rate limiter is needed is to compensate for the local speed-up that is allowed by the in-packet rate limiter, as described above. If speed-up between chunks or cells is allowed during transmission of a particular packet, then the overall data rate may exceed the maximum transmit data rate. Therefore, the inter-packet wire speed rate limiter delays a subsequent packet (which may or may not be the immediately following packet) so that, on average, the maximum transmit data rate is not exceeded. Of course, there also may be other conditions that cause the data rate to exceed the maximum transmit data rate, and the inter-packet wire speed rate limiter spaces out the packets to lower the overall transmission rate in any such cases.

For example, with smaller packets, more than one chunk or cell may be processed during a single clock cycle. Because the next packet may be larger, and therefore take longer to process, there may be too much of a gap between packets, possibly leading to underrun. In such a case, the inter-packet wire speed rate limiter would delay the smaller packet by an amount too small to cause an unacceptable gap between the delayed packet and the packet that preceded it, but large enough to prevent an unacceptable gap between the delayed packet and the packet that follows the delayed packet (i.e., by a long enough period of time to allow the processing of the following larger packet), so that port utilization is within desired parameters.

Both of the two types of rate limiters described above operate toward the goal of meeting bandwidth expectations and limitations. A third type of rate limiter is provided in implementations of the subject matter of this disclosure, and operates toward the goal of meeting hardware limitations of the network device. Specifically, implementations of a network device may be limited in terms of the number of chunks or cells that can be transmitted in a given time interval, separately from the amount of data that can be transmitted in that same time interval. An inter-packet cell-rate limiter is provided for this purpose.

For example, with small packets, it may be possible for the data rate to be below the maximum transmit data rate but, because each packet, and therefore each cell, is small, the number of cells being transmitted per unit time may nevertheless exceed the maximum cell rate. As an illustration, in one implementation, the maximum transmit data rate is 400 Gbps, with a maximum cell rate—i.e., a maximum permissible quantity of packet buffer accesses during a time interval—of 1,000 Mcells/sec (i.e., 1 billion cells/sec). The bus width, and therefore the maximum cell size, is 128 B. If a small packet has a 64 B header cell and a 1 B payload cell, and there is a 20 B inter-packet gap, the cell rate would be:

$$\frac{400,000 \text{ Mb/sec}}{(8b/B) \times (65B + 20B)} \times 2 \text{ cells} = 1,176 \text{ Mcells/sec}$$

which exceeds the maximum cell rate even though the maximum bit rate is not exceeded. Therefore, the inter-packet cell-rate limiter is provided to limit the cell rate (even though that may reduce the bit rate below the maximum transmit data rate). The cell rate is limited only between packets, because limiting the cell rate within a packet may lead to an underrun condition.

The various rate limiters included in implementations of the subject matter of this disclosure include processing circuitry that operates according to the "leaky bucket" model under which a "bucket" of "tokens" is refilled at some rate, while at the same time tokens "leak out" of the bucket as data flows. Data can flow only if there are tokens in the bucket. Therefore, the refill rate determines the rate allowed by the rate limiter.

In implementations of the subject matter of this disclosure, the rate limiters operate at a resolution of fractional bits—i.e., each token represents a fraction of a bit (thus multiple tokens are consumed for each bit of data permitted to flow). In one implementation, each token represents 1/32 of a bit (i.e., 0.03125 bit).

One implementation of the in-packet rate limiter refills tokens every cycle of the transmit DMA clock (TXD_clk) as follows (where each token represents 1/32 of a bit):

Number_of_tokens=RndDn(port_speed_in_Gbps*1000*32)/TXD_clk_in_Mhz where TXD_clk may be the same as the packet buffer clock. Thus, e.g., for TXD_clk=PB_clk=810 Mhz, the number of tokens added every clock cycle is shown in the following table, as a function of the port speed:

| Port Speed (Gbps) | Tokens (at 32 tokens/bit) |
|---|---|
| 10 | 395 |
| 20 | 790 |

| Port Speed (Gbps) | Tokens (at 32 tokens/bit) |
|---|---|
| 25 | 987 |
| 40 | 1580 |
| 50 | 1975 |
| 100 | 3950 |
| 200 | 7901 |
| 400 | 15802 |

At the beginning of each packet—i.e., at the "start-of-packet (SOP)" request for the first chunk or cell of a packet—the rate limiter "bucket" will be loaded with an additional number of fractional-bit tokens associated with the packet header and the first chunk or cell of the packet payload (because those portions of data are guaranteed to have already been placed in the packet buffer). That initial number of tokens serves as a reservoir of extra tokens that can be used for speeding up the data to overcome misalignment of packets as described above. Generally, the initial number of tokens is equal to the number of bytes in the header and the first chunk or cell of the payload, multiplied by the number of bits per byte and then by the number of tokens per bit. For example, if the header is 128 B, and the first chunk or cell of the payload is 32 B, then (still assuming 32 tokens/bit):

Number_of_tokens=8b/B×32tokens/b×(128 B+32 B)=40960 tokens

From that point on, the rate limiter will block any requests that would require more tokens than are present in the bucket. In some implementations, the rate limiter includes a setting for a maximum accumulated number of tokens, as protection against a case where the transmit buffer (TXFIFO) is full. As a practical matter, the maximum number of tokens is limited in some implementations by the size of the counter used as the token "bucket."

One implementation of the inter-packet wire-speed rate limiter refills tokens every clock cycle as follows:

Cfg_fraction_of_bits_per_cc=RndDn(port_speed_in_Gbps*1000*32/TXD_clk_in_Mhz)

for the example where each token represents ⅟32 bit. If:

Cfg_IPG is the inter-packet gap between packets without in-packet speed-up (may be lower than 20 B if there is in-packet speed-up);

Cfg_allowed_extra_inter_packet_fraction_of_bits is the setting for the extra number of fractional bits allowed for the specific port on top of the full wire-speed rate;

Pkt_size_in_fraction_of_bits is the number of fractional bits in a specific packet; and Diff_trans_vs_ideal is the difference between the number of fractional bits which were actually requested and the ideal number of fractional bits associated with the time between the SOP cell request and the EOP ("end-of-packet") cell request, for a specific packet, then the number of tokens is determined as follows:

First, Ideal_rate_count and Diff_trans_vs_ideal are initialized to '0'. Next, from the moment of the SOP request, until occurrence of the EOP request:

Ideal_rate_count=Ideal_rate_count_previous+Number_tokens_per_cc to make sure that there is wrap-around protection in case the transmit buffer is full even though tokens are being accumulated. The Number_tokens_per_cc is added from the first clock cycle, meaning that for the example case where the SOP clock cycle is the EOP clock cycle (i.e., the case of a single-celled packet), Ideal_rate_count_previous=0, and the Ideal_rate_count will be equal to Number_tokens_per_cc.

On the EOP cell request:
Diff_trans_vs_ideal=
  max(0, Diff_trans_vs_ideal_previous+Pkt_size_in_tokens+cfg_IPG-Ideal_rate_count);
Reset Ideal_rate_count On each clock cycle between an EOP request and the next approved SOP request:
Diff_trans_vs_ideal=
  max(0, Diff_trans_vs_ideal_previous-Number_tokens_per_cc);

An SOP request is approved when:
(Diff_trans_vs_ideal_previous<==Cfg_allowed_extra_inter_packet_tokens)

The actual calculation is the same as in the case of the in-packet rate limiter, above:

| Port Speed (Gbps) | Tokens (at 32 tokens/bit) |
|---|---|
| 10 | 395 |
| 20 | 790 |
| 25 | 987 |
| 40 | 1580 |
| 50 | 1975 |
| 100 | 3950 |
| 200 | 7901 |
| 400 | 15802 |

The cell-rate limiter operates similarly to the inter-packet wire speed rate limiter, except that the tokens are quantized in 1/4096 cell (i.e., 0.0002441 cell) instead of ⅟32 bit, and there is no inter-packet gap. The initialized number of tokens is:

4×4096=16,384

For a 400 Gbps port, with a cell-rate limit of 1000 Mcell/sec:
RndDn((PortSpeed/400)×CellRate_for_400×granularity_tokens/txd_clk)=RndDn((PortSpeed/400)×1000×4096/810)

More generally, e.g., for TXD_clk=PB_clk=810 Mhz, the number of tokens added every clock cycle is shown in the following table, as a function of the port speed:

| Port Speed (Gbps) | Cfg_fraction_of_cells_per_cc (at 4096 tokens/cell) |
|---|---|
| 10 | 126 |
| 20 | 252 |
| 25 | 316 |
| 40 | 505 |
| 50 | 632 |
| 100 | 1264 |
| 200 | 2528 |
| 400 | 5056 |

In most implementations of the subject matter of this disclosure, for each Ethernet port of the network device, there may be one in-packet rate limiter, one inter-packet wire-speed rate limiter, and one inter-packet cell-rate limiter.

FIG. 1 shows the Transmit, or Egress, portion of an implementation of a network device 100 incorporating the subject matter of this disclosure. Network device 100 includes at least one packet buffer 101 which receives, from Transmit Direct Memory Access (TXDMA) circuitry 102, packets to be transmitted out of network device 100. Packet buffer 101 may be a single storage device capable of operating with latencies for different types of packets, or may be a plurality of storage devices 111, each of which operates at a separate latency. In response to requests received at 103, packet buffer 101 supplies chunks or cells of network packets to transmit buffer 104, for transmission at 105 out of network device 100.

Within TX DMA circuitry 102, a port arbiter 112 selects which port is to be served. Packet-reading logic 132 then selects, from packet descriptor pool 122, a descriptor that identifies a packet, or portion of a packet, to be retrieved. The selection may be based, in some implementations, on a predetermined line-up of cells to be retrieved. Packet-reading logic 132 sends a cell request at 142 to request decision logic 152. In some implementations, the cell request at 142 identifies the packet, or portion of a packet, to be retrieved, the amount of data in the current chunk or cell being requested, and an identification of whether the request is an SOP request, an EOP request, or an MP request (i.e., a "middle-of-packet" request for a chunk or cell of data that is not from the beginning or the end of the packet).

Request decision logic 152 receives inputs from rate limiter circuitry 162, which includes the three type of rate limiters discussed above—in-packet rate limiter (in-packet RL) 1621, inter-packet wire-speed rate limiter (inter-packet RL) 1622, and inter-packet cell-rate limiter (CELL RL) 1623. Settings for each port are maintained at 1620, so that each rate limiter 1621, 1622, 1623 can determine the current number of available tokens for any port, and provide that number to request decision logic 152.

Regardless of the number of tokens available for a particular port, data cannot be transmitted from packet buffer 101 to transmit buffer 104 unless there is capacity available in transmit buffer 104 to receive and store the data. Therefore, cell/word credit circuitry 172 also provides an input to request decision logic 152. Cell/word credit circuitry 172 receives an input 182 from transmit buffer 104 which increments a number of credits stored in cell/word credit circuitry 172 when data is transmitted out of transmit buffer 104, and decrements the number of credits stored in cell/word credit circuitry 172 when data is received by transmit buffer 104.

Figure 2:
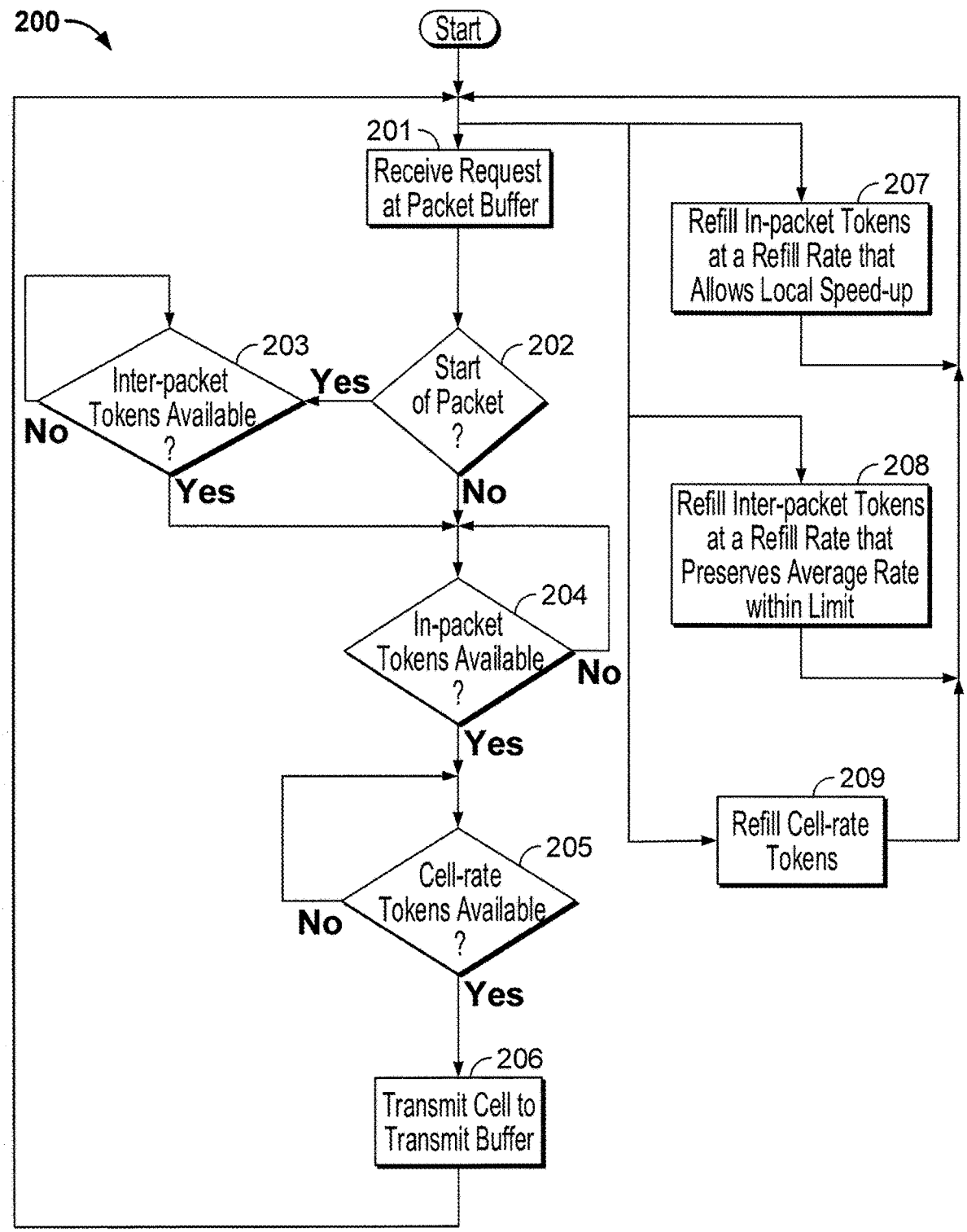
FIG. 2 is a flow diagram of a method of operating a network device in accordance with implementations of the subject matter of this disclosure.

An implementation of a method 200 of operating a network device having rate limiters as described above is diagrammed in FIG. 2. (FIG. 2 does not account for cell/word credit circuitry 172.) At 201, a request for a chunk or cell of a network packet is received. At 202, it is determined whether or not the request is a start-of-packet request. If so, then at 203 it is determined whether or not there are sufficient inter-packet tokens available in inter-packet wire-speed rate limiter 1622. If not, flow loops back at 203 until sufficient inter-packet tokens are available in inter-packet wire-speed rate limiter 1622.

Once sufficient inter-packet tokens are available in inter-packet wire-speed rate limiter 1622, or if at 202 it was determined that the request was not a start-of-packet request, flow proceeds to 204 where it is determined whether or not sufficient in-packet tokens are available in in-packet rate limiter 1621. If not, flow loops back at 204 until sufficient in-packet tokens are available in in-packet rate limiter 1621.

Once sufficient in-packet tokens are available in in-packet rate limiter 1621, flow proceeds to 205 where it is determined whether or not sufficient cell-rate tokens are available in cell-rate limiter 1623. If not, flow loops back at 205 until sufficient in-packet tokens are available in cell-rate rate limiter 1623. Once sufficient in-packet tokens are available in cell-rate limiter 1623 (if looping was required or if the tokens were available without looping), then at 206 the requested data is transmitted from packet buffer 101 to transmit buffer 104.

Meanwhile, in parallel with 201-206, tokens are being refilled at 207 in in-packet rate limiter 1621, at 208 in inter-packet wire-speed rate limiter 1622, and at 209 in cell-rate limiter 1623, according to the criteria explained above. The constant refilling (at appropriate rates) of tokens in in-packet rate limiter 1621, inter-packet wire-speed rate limiter 1622, and cell-rate limiter 1623, allow loops at 203, 204, 205 to eventually end even when the number of tokens was insufficient to proceed with transmission when the respective loop was entered.

Thus it is seen that a network device having a rate limiting mechanism that provides speed-up within a packet (i.e., between chunks or cells) to overcome misalignment while avoiding read-before-write, with full control over the average data rate notwithstanding speed-up, to prevent underrun conditions, and which is programmable, by changing the rules for token generation, to allow adjustment of rate restrictions in either direction, has been provided.

As used herein and in the claims which follow, the construction "one of A and B" shall mean "A or B."

It is noted that the foregoing is only illustrative of the principles of the invention, and that the invention can be practiced by other than the described implementations, which are presented for purposes of illustration and not of limitation, and the present invention is limited only by the claims which follow.

What is claimed is:

1. A network device for a communications network, the network device comprising:
 a port configured to transmit data to the communications network, the port configured to transmit data units at a maximum transmit data rate;
 a transmit buffer configured to buffer data units that are ready for transmission to the communications network;
 a packet buffer configured to buffer data units before the data units buffered in the packet buffer are ready for transmission, the packet buffer further configured to output data units buffered in the packet buffer, in response to a read request, at a maximum packet buffer transmission rate that is faster than the maximum transmit data rate;
 a rate controller configured to control a transmission rate of data from the packet buffer to the transmit buffer so that averaged over a period of time for transmitting a plurality of data units from the packet buffer to the transmit buffer, the transmission rate of data from the packet buffer to the transmit buffer is at most equal to the maximum transmit data rate, while allowing the transmission rate of data from the packet buffer to the transmit buffer, at one or more selected time intervals, to exceed the maximum transmit data rate.

2. The network device of claim 1, wherein the rate controller is further configured to limit the transmission rate of data from the packet buffer to the transmit buffer according to a rate-limiting parameter that is different from the maximum transmit data rate.

3. The network device of claim 2, wherein the rate-limiting parameter that is different from the maximum transmit data rate is a cell rate governing a permissible quantity of packet buffer accesses during a time interval.

4. The network device of claim 1, wherein the rate controller allows the transmission rate of data from the packet buffer to the transmit buffer to exceed the maximum transmit data rate to align header and payload portions of a network packet.

5. The network device of claim 1, wherein the rate controller comprises:
 an in-packet rate limiter configured to control rate of transmission of data within a network packet;

an inter-packet wire-speed rate limiter configured to control spacing between network packets; and an inter-packet cell-rate limiter configured to control a quantity of data cells that are transmitted from the packet buffer to the transmit buffer during a time interval.

6. The network device of claim 5, wherein the in-packet rate limiter is configured to limit the rate of transmission of data within the network packet to prevent read-before-write in a cut-through packet.

7. The network device of claim 5, wherein the in-packet rate limiter is configured to control the rate of transmission of data within the network packet to align header and payload portions of the network packet.

8. The network device of claim 7, wherein the in-packet rate limiter is configured to increase the rate of transmission of data, within the network packet, above the maximum transmit data rate.

9. The network device of claim 8, wherein the in-packet rate limiter is configured to increase the rate of transmission of data within the network packet to at most the maximum packet buffer transmission rate.

10. The network device of claim 8, wherein the inter-packet wire-speed rate limiter increases spacing between network packets to limit the transmission rate of data from the packet buffer to the transmit buffer to the maximum transmit data rate on average over packets, notwithstanding the increasing the rate of transmission of data within the network packet above the maximum transmit data rate.

11. The network device of claim 7 wherein:
the in-packet rate limiter comprises processing circuitry that:
allows transmission of data when tokens are available in a reservoir of tokens;
deducts tokens from the reservoir of tokens when data is transmitted;
periodically adds tokens to the reservoir according to a rule; and
adds a quantity of additional tokens to the reservoir on receipt of a request to start a new packet, the quantity of additional tokens being based on sizes of a header of the new packet and a first portion of the new packet.

12. The network device of claim 5, wherein:
the inter-packet cell-rate limiter is configured to limit the quantity of data cells that are transmitted from the packet buffer to the transmit buffer during the time interval to a maximum permissible quantity of packet buffer accesses during the time interval.

13. The network device of claim 5, wherein each respective one of the in-packet rate limiter, the inter-packet wire-speed rate limiter, and the inter-packet cell-rate limiter, comprises respective processing circuitry that:
allows transmission of data when tokens are available in a respective reservoir of tokens;
deducts tokens from the respective reservoir of tokens when data is transmitted; and
periodically adds tokens to the respective reservoir according to a respective rule for the respective one of the in-packet rate limiter, the inter-packet wire-speed rate limiter, and the inter-packet cell-rate limiter.

14. A method of operating a network device coupled to a communications network, the method comprising:
transmitting data out of the network device via a transmit buffer to a port having a maximum transmit data rate, from a packet buffer configured to buffer data units before the data units buffered in the packet buffer are ready for transmission, the packet buffer further configured to output data units buffered in the packet buffer, in response to a read request, at a maximum packet buffer transmission rate that is faster than the maximum transmit data rate;

controlling a transmission rate of data from the packet buffer to the transmit buffer so that averaged over a period of time for transmitting a plurality of data units from the packet buffer to the transmit buffer, the transmission rate of data from the packet buffer to the transmit buffer is at most equal to the maximum transmit data rate; and permitting the transmission rate of data from the packet buffer to the transmit buffer, at one or more selected time intervals, to exceed the maximum transmit data rate without causing the controlled transmission rate of data averaged over time to exceed the maximum transmit data rate.

15. The method of claim 14, wherein the controlling comprises limiting the transmission rate of data from the packet buffer to the transmit buffer according to a rate-limiting parameter that is different from the maximum transmit data rate.

16. The method of claim 15, wherein the controlling comprises limiting the transmission rate of data from the packet buffer to the transmit buffer according to a cell rate governing a permissible quantity of packet buffer accesses during a time interval.

17. The method of claim 14, wherein the controlling comprises allowing the transmission rate of data from the packet buffer to the transmit buffer to exceed the maximum transmit data rate to align header and payload portions of a network packet.

18. The method of claim 14, wherein the controlling the transmission rate of data from the packet buffer to the transmit buffer comprises:
controlling a rate of transmission of data within a network packet;
controlling spacing between network packets; and
controlling a quantity of data cells that are transmitted from the packet buffer to the transmit buffer during a time interval.

19. The method of claim 18, wherein the controlling rate of transmission of data within a network packet comprises limiting the rate of transmission of data within the network packet to prevent read-before-write in a cut-through packet.

20. The method of claim 18, wherein the controlling rate of transmission of data within a network packet comprises limiting the rate of transmission of data within the network packet to align header and payload portions of the network packet.

21. The method of claim 20, wherein the controlling the rate of transmission of data within a network packet comprises increasing the rate of transmission of data, within the network packet, above the maximum transmit data rate.

22. The method of claim 21, wherein the controlling rate of transmission of data within a network packet comprises increasing the rate of transmission of data within the network packet to at most the maximum packet buffer transmission rate.

23. The method of claim 21, wherein the controlling spacing between network packets comprises increasing spacing between network packets to limit the transmission rate of data from the packet buffer to the transmit buffer to the maximum transmit data rate on average over packets, notwithstanding the increasing the rate of transmission of data within the network packet above the maximum transmit data rate.

24. The method of claim 18, wherein:
the controlling a quantity of data cells that are transmitted from the packet buffer to the transmit buffer during a time interval comprises limiting the quantity of data cells that are transmitted from the packet buffer to the transmit buffer during the time interval to a maximum permissible quantity of packet buffer accesses during the time interval.

* * * * *